Patented Dec. 21, 1943

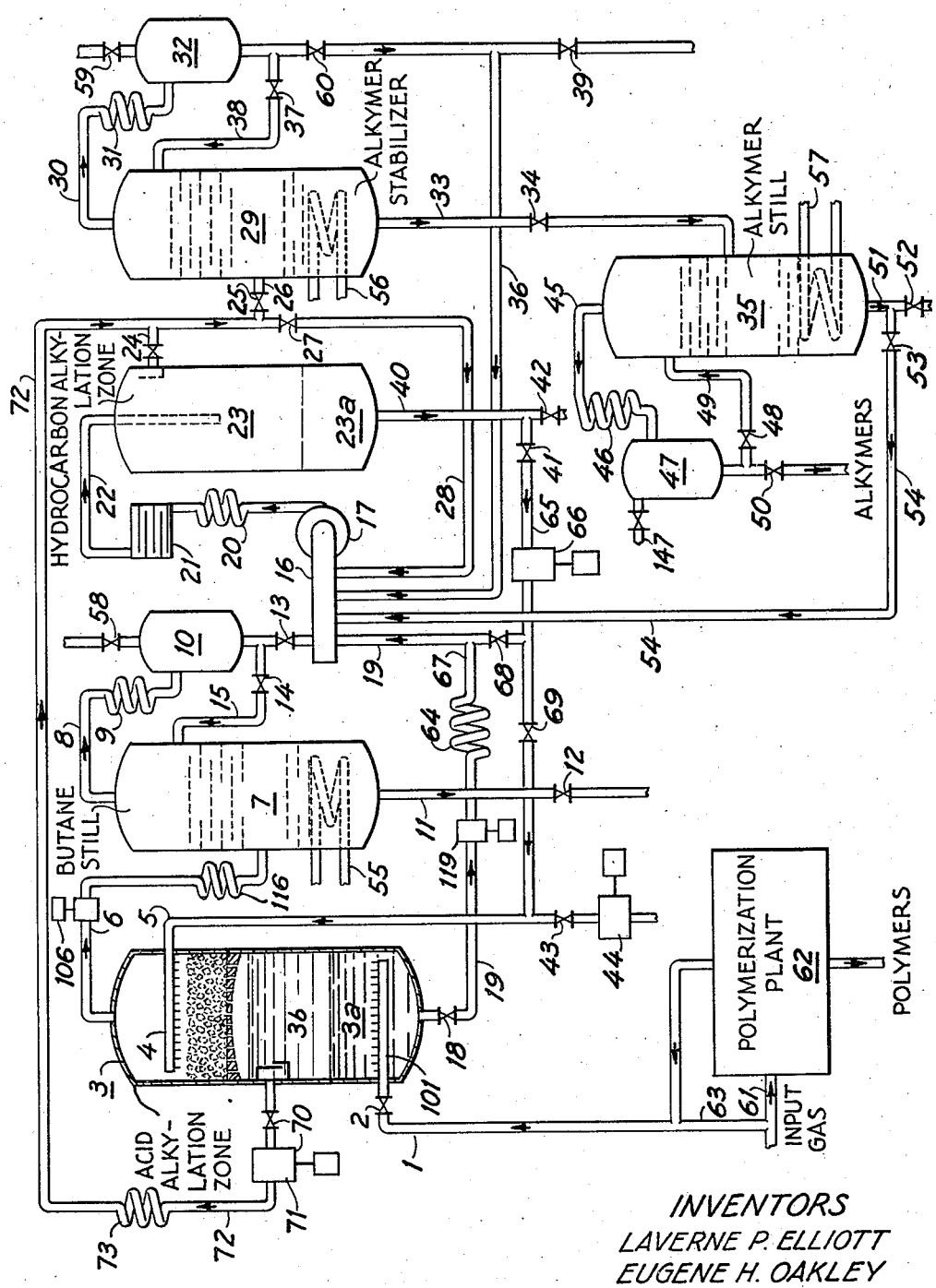

2,337,265

UNITED STATES PATENT OFFICE 2,337,265

REACTION OF HYDROCARBONS

Eugene H. Oakley, El Cerrito, and Laverne P. Elliott, Berkeley, Calif., assignors to Standard Oil Company of California, San Francisco, Calif., a corporation of Delaware Application December 16, 1940, Serial No. 370,332

5 Claims. (Cl. 260—683.4)

This invention relates to an improved process for the alkylation of isoparaffins and, more particularly, to a process wherein said isoparaffins are alkylated by means of an alkylated acid for the production of isoparaffins suitable for use in liquid motor fuels of high antiknock value and for other uses.

It has previously been disclosed that the isoparaffinic hydrocarbons, such as isobutane and isopentane, may be caused to react with the olefins of low molecular weight, such as propylene, the butenes and the pentenes, by means of liquid acid catalysts, such as concentrated sulfuric acid. The products of this reaction correspond in substantial part to the union of one molecule of isoparaffin with one molecule of olefin. This reaction is herein referred to as one of "alkylation" and the products as "alkymers." The alkymers produced from the isoparaffins containing less than six carbon atoms per molecule and the normally gaseous olefins have a high antiknock value and are therefore particularly suited for use in the preparation of aviation motor fuels.

In one method which has been proposed for effecting the foregoing alkylation reaction, the isoparaffin and olefin reactants are intimately contacted in the presence of the liquid sulfuric acid catalyst and the alkymers formed are separated from the catalyst and unreacted raw material by any appropriate means.

In another specific method advantage is taken of the discovery that the alkylation of an isoparaffin by an olefin, in the presence of a strong acid of the nature of sulfuric acid, is not a single reaction but is in fact the sum of two entirely distinct reactions which may therefore be separated and each effected under the conditions best suited to it with considerable improvement in operation and in the net result obtained.

The maximum benefits to be derived from the above method of conducting the alkylation reaction in two separate stages are, however, largely dependent upon the specific manner in which each stage is effected and the arrangement of the stages with respect to other necessary operations in a complete process for producing alkymers boiling in the range of motor fuels from readily available raw materials.

It is an object of the present invention to provide an improved process for effecting the alkylation of an isoparaffin wherein improved yields of alkymer of improved quality are obtained.

It is a more specific object of this invention to provide an improved process for effecting the alkylation of an isoparaffin by an olefin in two separate stages in which the conditions of reaction may be independently controlled.

It is another specific object of the present invention to provide an improved process for utilizing hydrocarbon mixtures comprising olefins, isoparaffins and normal paraffins for producing alkymers of the olefins with the isoparaffins by effecting the reaction in two separate stages through the agency of an acid alkylating medium.

It is a still more specific object of our invention to provide, in a method of producing alkymers from a mixture of isoparaffins and olefins by a two-stage reaction, an improved process wherein the alkylation of the isoparaffin is substantially confined to the second stage in which conditions most favorable to said alkylation may be maintained.

It is another specific object of the present invention to provide an improved two-stage process for alkylating isoparaffins with olefins wherein the acid is alkylated in the first stage by means of olefins in gas phase, a liquid hydrocarbon layer is separated from the acid and alkylated acid is used to alkylate liquid isoparaffin in the second stage.

Other important objects of the invention will be apparent from the following description and the appended claims.

The two entirely separate and distinct reactions mentioned above as resulting in the alkylation of an isoparaffin by an olefin in the presence of a strong acid of the sulfuric acid type are; first, the alkylation of the acid by the olefin to form a solution containing some of the alkyl acid ester of the acid, some polymers and apparently some as yet unidentified compound between the acid and the olefin or a polymer or other reaction product thereof, and second, the reaction of the alkylated acid solution thus produced with the isoparaffin to form the alkyl isoparaffin or alkymer and release the acid.

In the alkylation of isobutane with butene by means of sulfuric acid, the acid alkylation reaction takes place readily with acid of any strength above about 50% $H_2SO_4$ at ordinary atmospheric temperatures with the butene in either gaseous or liquid phase. The second reaction, however, requires the isobutane to be in liquid phase, the contact between isobutane and the alkylated acid solution to be extremely good, the concentration of butyl acid sulfate, other alkyl components and free sulfuric acid to be within certain limits, the ratio of isobutane to total acid alkylation products to be high and the temperature to be closely controlled in order to obtain a satisfactory rate of reaction and to avoid undesirable side reactions. The specific combinations of conditions best suited to each reaction are therefore usually and advantageously not the same and worthwhile economies and improvement in products are obtained when the reactions are carried out separately and each under the combination of conditions best suited to it. When the acid and the isobutane alkylation reactions are not completely separated the maximum benefits are, of course, not obtained.

Convenient sources of olefins and isoparaffins in large volume for the production of alkymers of high antiknock value boiling in the range of aviation motor fuels are to be found in the mixtures of $C_5$ and lighter hydrocarbons produced during the cracking of petroleum oils or by the partial dehydrogenation of natural gas fractions. In such mixtures olefins, isoparaffins and normal paraffins usually occur together in proportions determined by the severity of the cracking or dehydrogenation treatment and the specific nature of the oil or natural gas fraction treated. In applying the above two-stage method of alkylation to such a mixture it is most convenient to effect the acid alkylation step by contacting the whole mixture with the acid under the appropriate conditions whereby the olefin is readily taken up by the acid, leaving the mixture of normal and isoparaffins. Unless, however, special precautions are taken to prevent it some alkylation of the isoparaffin will be effected at the same time, even though the conditions are not particularly favorable to it, and, as pointed out above, the maximum possible benefits of the two-stage method will accordingly not be realized.

We have now found that by effecting the acid alkylation stage in a particular manner the advantage of employing a hydrocarbon mixture containing both olefins and isoparaffins for alkylating the acid in the first or acid alkylation stage of a two-stage isoparaffin alkylation process may be enjoyed without effecting an undesirable amount of isoparaffin alkylation in the said first stage, and a considerable improvement in the over-all operation of the process and in the quantity of the alkymer product produced may be effected.

According to one embodiment of the process of the present invention, the acid alkylation reaction is effected by dispersing the acid in and permitting it to fall by gravity through a body of ascending hydrocarbon gas mixture containing both olefin and isoparaffin and separating the accumulated acid containing the alkyl acid eter and other compounds formed during the acid alkylation reaction without effecting substantial or prolonged contact between the acid and the hydrocarbon sufficient to give the intimacy of contact which is necessary to effect substantial alkylation of the isoparaffin.

According to another specific embodiment of the process of the present invention, the hydrocarbon gas mixture containing olefins and isoparaffins may be bubbled into and caused to ascend through a column of the liquid acid whereby the olefin is taken up by the acid and the isoparaffin is separated and removed from the top of the column.

According to still another and preferred embodiment of the process of the present invention, the acid alkylation reaction is effected according to the continuous countercurrent principle wherein the gaseous hydrocarbon mixture containing both olefin and isoparaffin is caused to pass upwardly through a vessel of appropriate dimensions, such as a 10' x 40' cylindrical drum, while the liquid acid is dispersed from a suitable distributor placed near the top of said vessel and flows by gravity over suitable trays or an appropriate packing disposed therein to provide a large surface of contact between the descending acid and the ascending hydrocarbon gases. The acid may be collected in a reservoir at the bottom of the vessel and provision may be made for the entering hydrocarbon gases to bubble therethrough. The paraffinic gases substantially free of olefins are collected at the top of the acid alkylation vessel and appropriately disposed of, as described hereinafter, while the alkylated acid is withdrawn from the bottom of the vessel and sent to the hydrocarbon alkylation stage.

In any such method of operation the relation between the quantities of hydrocarbon and acid charged per unit of time may be varied so as to remove substantially all of the olefin without effecting an intimacy or time of contact that will result in an undesirable amount of alkylation of the isoparaffin under the temperature and other conditions most suitable to the acid alkylation reaction and which may be relatively unsuitable to the isoparaffin alkylation reaction.

A considerable portion of the acid entering the acid alkylation zone will ordinarily be acid which is recycled from the hydrocarbon alkylation zone. Such acid will usually be found to carry a considerable amount of hydrocarbon containing alkymer product from the hydrocarbon alkylation zone. It is a particular feature of the present invention that provision is made in the acid alkylation zone for collecting this hydrocarbon separately from the normal and isoparaffins charged thereto along with the olefin used to alkylate the acid, as will be more fully explained hereinafter.

A convenient widely available source of isoparaffin for alkylation, and of olefin for effecting the alkylation, is the $C_4$ or butene-butane fraction of the hydrocarbons resulting from the cracking of petroleum for the production of motor gasoline. The analysis of a typical butene-butane cut produced in the liquid phase cracking of a petroleum oil is as follows:

*Gas analysis*

| | Percent |
|---|---|
| $C_3$ and lighter | 3.1 |
| Isobutene | 17.5 |
| Normal butenes | 26.5 |
| Isobutane | 18.0 |
| Normal butane | 34.6 |
| $C_5$ and heavier | 0.3 |
| | 100.0 |

According to the process of the present invention, such a fraction as produced, or after appropriate purification for the removal of nitrogen and sulfur-containing compounds or after selective polymerization for removal of the isobutene or the isobutene and a portion of the normal butenes, is contacted as just described with a strong acid of the sulfuric acid type, such as concentrated sulfuric acid, whereby the butenes are caused to react with the acid forming the corresponding butyl acid esters and other compounds mentioned above. The remaining, substantially olefin free, mixture of normal and isobutane is fractionally distilled to separate the two and the isobutane so produced is then very intimately contacted with the alkylated acid solution whereby the isobutane is alkylated to produce a mixture of hydrocarbons having high antiknock value and boiling substantially in the range of aviation gasoline.

The process of our present invention may be better understood by referring to the figure of the attached drawing. A hydrocarbon mixture containing olefins and both normal and isoparaffins, such as the above butane-butene cut, produced in a petroleum cracking process or by the partial dehydrogenation of a fraction from natural gas, with or without first having been treated for the removal of nitrogen and sulfur-containing compounds may be passed through line 61 to a polymerization plant 62 wherein the isobutene or the isobutene and a portion of the normal butene is polymerized by any known method and the remaining mixture, still containing some normal butene, is led in gas phase through line 1 and valve 2 and injected through an appropriate manifold 101 into the acid alkylating zone 3 wherein it is contacted with sulfuric acid containing between about 50 and 100% $H_2SO_4$ introduced from line 5 through an element 4, which is preferably a device for distributing the sulfuric acid uniformly over the trays, Raschig rings or other means provided for exposing a large surface of acid to the ascending hydrocarbon gas mixture. If the conversion of a portion of the butene to polymers is not desired, the whole $C_4$ cut may be charged through lines 63 and 1 direct to the acid alkylating zone 3. It has been found that by conducting the acid alkylating reaction in the gaseous phase it is possible to collect in liquid phase the hydrocarbons which enter the acid alkylating zone 3 with the recycled acid, thus keeping them separate from the saturated hydrocarbon gases associated with the olefin in the raw material charged to zone 3. The recovery of alkymer product contained in the recycled hydrocarbon liquid is thereby materially simplified while its quality is preserved through preventing its deterioration by the acid. The liquid hydrocarbon layer, 3b, which is collected in zone 3 may be discharged through valve 70 into line 72 and forced by pump 71 through an appropriate cooler and condenser 73 to line 26 and thence to the alkymer stabilizer 29.

The temperature in the acid alkylating zone 3 should be maintained above the melting point of the alkylated acid solution but below the point at which substantial destructive reaction between the acid and the butene takes place. A convenient range of temperature has been found to be from about 15° to 150° F. with the preferred temperature being toward the lower side of this range in order to minimize possible undesirable side reactions, which not only consume valuable butene but also cause deterioration of the acid as an alkylation medium. The rate at which hydrocarbon and acid are supplied to zone 3 may be so regulated as to give any desired concentration of butyl acid sulfate and other products of the acid alkylation reaction in the separated acid layer, indicated by 3a. Consistent with the conditions prevailing in the acid alkylating zone 3 and the greatest advantage with respect to effecting succeeding stages of the process, the concentration of the total reaction products in solution in the alkylated sulfuric acid leaving the acid alkylating zone 3 may be from a fraction of 1% to about 20% by weight for the best results, depending upon the particular combination of conditions employed, the preferred concentration usually, however, being toward the low side of this range.

The mixture of normal and isobutane remaining after absorption of the butenes is passed through line 6, compressor 106 and condenser 116 to a butane still 7, equipped with an appropriate heating device 55, wherein separation of the isobutane from the normal butane is effected, the latter being removed from the system through line 11 and valve 12. The substantially pure isobutane passing overhead from still 7 is conducted through line 8 and condenser 9 to receiver 10 from which propane or other uncondensed gas may be vented through valve 56. A portion of the liquid isobutane collected in receiver 10 may be returned through valve 14 and line 15 to provide reflux liquid in the butane still while the remainder is led through valve 13 into manifold 16 for mixture with the alkylated acid solution which is conducted from zone 3 through valve 18, line 19, pump 119 and cooler 64 for removing exothermic heat of reaction when desired.

The mixture of isobutane and alkylated acid solution in manifold 16 is led directly into an appropriate device 17 for effecting intimate contact between an aqueous and an oil phase. In order to insure the completion of the alkylation reaction, the mixture may be passed from contactor 17 through an appropriate auxiliary device 21 wherein additional turbulence and time for reaction may be provided. The temperature in the hydrocarbon alkylation zone (17, 20 and 21) should be under accurate control, and to this end a coil 20 may be interposed for adding or removing heat as desired. From the auxiliary contactor 21 the mixture of acid, unreacted isobutane and alkymer product is passed through line 22 into an acid separator 23 wherein acid is collected as indicated at 23a for removal from the system through line 40 and valve 42 or for return through valve 41, line 65, pump 66 and valve 69 to line 5 and the acid alkylating zone 3 or through valve 68 to line 19 and the hydrocarbon alkylating zone 17—21.

The hydrocarbon phase comprising isobutane and alkymer product is removed from separator 23 through valved line 24 and passed through valve 25 and line 26 to an alkymer stabilizer 29 or, if desired, a portion of the hydrocarbon phase may be returned through valve 27 and line 28 to the manifold 16, as more fully described hereinafter.

In the alkymer stabilizer 29 separation is effected between the alkymer product and the excess of isobutane which is then led through line 30 and condenser 31 to receiving drum 32 while the alkymer product is passed through line 33 and valve 34 to an alkymer distillation unit 35. A portion of the liquid isobutane collected in receiver 32 may be returned through valve 37 and line 38 to provide reflux liquid to the alkymer stabilizer 29 while another portion of the liquid isobutane is passed through valve 60 and line 36 to manifold 16.

In order that the hydrocarbon alkylating reaction in zone 17—21 may be as rapid and complete as possible, it is desirable to provide a high ratio of isoparaffin to total alkyl components in the alkylated acid solution, for instance, of the order of ten to one or above by weight. In order to produce the highest possible yield of alkymers having the highest antiknock value, it has been found desirable to maintain this ratio in a somewhat higher range as, for instance, between about 100 and 700 to 1. In order that such ratio may be established and maintained, it is necessary that the hydrocarbon mixture entering zone 3 from line 1 contain more isoparaffin than olefin or that additional isobutane be supplied to the system from an external source through valve 39 and line 36. When additional isobutane is not readily available or for other reasons it is desired to employ only the butene and isobutane of the C₄ cut for alkylation, the desired ratio may be established by first polymerizing the excess butene as above indicated. An additional advantage is obtained by so operating such polymerization step that the isobutene is selectively polymerized since not only does di-isobutene when hydrogenated give a product having a higher octane number than the hydrogenated normal or mixed butene polymers but the alkymers of isobutane with normal butene have a higher octane number than those produced from isobutane with isobutene. The ratio of isoparaffin to acid alkylation products may also be augmented by recirculating a portion of the hydrocarbon phase from separator 23 to manifold 16, as above-mentioned.

Since the hydrocarbon liquid collected at 3b will ordinarily contain traces of normal butane, it will usually be desirable to permit this to remain in the alkymer product leaving stabilizer 29. This product is led through line 33 and valve 34 to still 35, which contains an appropriate heating element 57, for fractionation to produce a motor fuel of the desired end point which passes through line 45 and condenser 46 to receiving drum 47 from which a portion of the condensed alkymers may be returned through valve 48 and line 49 to provide reflux liquid in the still 35 and from which alkymers may be removed to storage through valve 50. The higher boiling alkymers, which constitute the bottoms from alkymer still 35, may be removed from the system through line 51 and valve 52, though it has been found that if they are returned through valve 53 and line 54 to manifold 16 and the hydrocarbon alkylation zone 17—21, the further production of heavy alkymers may be substantially repressed and a material increase in the yield of light motor fuel from a given quantity of original isoparaffin and olefin may be realized. Uncondensed normal butane may be vented from drum 47 through valved line 147 if desired.

While the quantity of the hydrocarbon reactants lost to side reactions is materially reduced by effecting the alkylation reaction in two stages, as above described, and carefully controlling the reaction conditions in each stage, a small quantity of highly unsaturated terpene-like hydrocarbon still accumulates in the acid and eventually interferes with its further use as the alkylation medium. It has, however, been found that if a small portion of the acid in the system is continually replaced with fresh acid, the activity of the acid in the system may be indefinitely prolonged. Acid for charging the system originally and for such replacement may be supplied through pump 44 and valve 43 to line 5 and the acid alkylating zone 3 or, if preferred, the replacement acid may be added to the alkylated acid entering the hydrocarbon alkylation zone 17—21 through a connection not shown. Acid to compensate for the fresh acid added may be removed from line 40 through valve 42.

One particular feature of the process of the present invention resides in the position of the butane still 7 between the acid alkylation zone 3 and the hydrocarbon alkylation zone 17—21. By eliminating the normal butane from the mixture of hydrocarbons in the system at this point, after removal of olefins in the acid alkylation zone 3 but prior to the hydrocarbon alkylation zone, a considerable saving in distillation is effected over that which would be necessary if the normal butane removal were effected at a point in the system, beyond the manifold 16, in which the isoparaffin ratio is maintained at a high value by isobutane recirculation, and/or addition as above described. Another essential feature of the process of the present invention consists in maintaining the hydrocarbon mixture containing the olefins with which the acid is alkylated in the vapor phase and thereby making possible the separation of a hydrocarbon liquid phase containing alkymer product from the acid which is recycled from the hydrocarbon alkylation zone.

Operation of the process of the present invention, as above described, may be better understood by reference to the following example: A butene-butane cut containing 2.0% propylene, 11.1% propane, 17.0% normal butenes, 18.3% isobutane and 50.5% of normal butane was charged in gas phase to the acid alkylating zone 3 while strong sulfuric acid containing a substantial proportion of acid recycled from the hydrocarbon alkylation zone was charged at a rate sufficient to absorb the olefin contained in the gas. The temperature in the acid alkylation zone was maintained between 50° and 60° F. and the pressure was about atmospheric. A liquid hydrocarbon phase was collected, as previously described, which contained over 10% of the total alkymer product.

The alkylated acid solution thus produced in zone 3 was then intimately contacted with a hydrocarbon mixture containing 84.8% isobutane, 8% normal butane and 7.2% propane in the hydrocarbon alkylation zone (16, 17, 20 and 21) at a temperature of 50° to 60° F. and a pressure of about 150 pounds per square inch. The volume ratio of hydrocarbon to acid was 2.3 to 11.5. After separation in zone 23 and stabilization in stabilizer 29, the alkymer product, amounting to 176% by weight of the olefin charged to zone 3, contained 94% of aviation gasoline (275° F. at 90% over) having a gravity of 69.8, a bromine number of zero and an octane number of 94.

While the feature of the present invention, which consists in effecting the acid alkylation reaction with an olefin containing mixture in vapor phase, finds its greatest utility when the olefin containing mixture also contains alkylatable isoparaffins, it is not limited to such raw materials and may be employed when the olefins and isoparaffins are introduced separately from totally different sources.

Among the significant features of the process of the present invention, which may be re-emphasized in summary, are the alkylation of an acid of the sulfuric acid type by a gaseous hydrocarbon mixture containing olefin and isoparaffin whereby the olefin is caused to alkylate the acid but not the isoparaffin, the alkylation of the isoparaffin in a separate zone in liquid phase by the alkylated acid in the entire absence of any additional olefin, the return of heavy alkymers from the alkymer still to the hydrocarbon alkylation zone, the return of acid liberated in the hydrocarbon alkylation zone to the acid alkylation zone, the separation and collection in the acid alkylation zone of a liquid hydrocarbon phase containing alkymer product and the removal of normal butane from the system at a point prior to the hydrocarbon alkylation stage in which it is desirable to maintain a high proportion of isobutane.

While the process of the present invention has been explained with particular reference to the alkylation of isobutane by butene, using sulfuric acid as the alkylation medium, it will be readily appreciated that the same two-stage process may be applied to the alkylation of other isoparaffins by the alkylated acid solution of any of the several known alkylating strong acids of the sulfuric acid type, such as chlorosulfonic acid, mixed sulfuric and phosphoric acids, mixed sulfuric and chlorosulfonic acids, etc.

This application is a continuation-in-part of our copending application Serial No. 287,528 filed July 31, 1939.

Having now fully described and exemplified our improved process for effecting the alkylation of an isoparaffin in two entirely separate stages, we claim as our invention:

1. Process of alkylating an isoparaffin for the production of isoparaffins of higher molecular weight, which comprises: bringing an acid alkylation catalyst recycled from a second zone and containing alkymer product into contact with a gaseous mixture containing normal paraffin, isoparaffin and olefin in a first zone, under conditions regulated to favor the formation of alkyl acid ester and to suppress isoparaffin alkylation and other possible reactions, thereby forming a solution of alkyl acid ester in an excess of the acid and liberating as an acid-insoluble liquid phase the alkymer product contained in the recycled acid, removing the said liberated liquid alkymer product from the first zone, removing unreacted gaseous normal and isoparaffins from the said first zone, fractionally separating normal from isoparaffins in the gaseous mixture removed from the said first zone and passing the separated isoparaffins to a second zone, alkylating the said isoparaffin in liquid phase by intimately contacting it in the second zone with the solution of alkyl acid ester formed in the first zone, under conditions favorable to said alkylation, whereby an isoparaffin of higher molecular weight is produced and acid alkylation catalyst is liberated, effecting a substantial separation of hydrocarbons from said liberated acid alkylation catalyst, and recycling at least a portion of said liberated acid alkylation catalyst to the aforesaid first zone for re-alkylation.

2. Process of alkylating an isoparaffin for the production of isoparaffins of higher molecular weight, which comprises: bringing an acid alkylation catalyst recycled from a second zone and containing alkymer product into contact with a gaseous mixture containing normal paraffin, isoparaffin and olefin in a first zone, under conditions regulated to favor the formation of alkyl acid ester and to suppress isoparaffin alkylation and other possible reactions, thereby forming a solution of alkyl acid ester in an excess of the acid and liberating as an acid-insoluble liquid phase the alkymer product contained in the recycled acid, removing the said liberated liquid alkymer product from the first zone and passing it to an alkymer stabilizer in order to recover stable alkymers therefrom, removing unreacted gaseous normal and isoparaffins from the said first zone, fractionally separating normal from isoparaffins in the gaseous mixture removed from the said first zone and passing the separated isoparaffin to a second zone, alkylating the said isoparaffin in liquid phase by intimately contacting it in the second zone with the solution of alkyl acid ester formed in the first zone, under conditions favorable to said alkylation, whereby an isoparaffin of higher molecular weight is produced and acid alkylation catalyst is liberated, effecting a substantial separation of hydrocarbons from said liberated acid alkylation catalyst, and recycling at least a portion of said liberated acid alkylation catalyst to the aforesaid first zone for re-alkylation.

3. Process of alkylating an isoparaffin for the production of isoparaffins of higher molecular weight, which comprises: bringing an acid alkylation catalyst recycled from a second zone and containing alkymer product into contact with a gaseous mixture containing normal paraffin, isoparaffin and olefin in a first zone, under conditions regulated to favor the formation of alkyl acid ester and to suppress isoparaffin alkylation and other possible reactions, thereby forming a solution of alkyl acid ester in an excess of the acid and liberating as an acid-insoluble liquid phase the alkymer product contained in the recycled acid, removing the said liberated liquid alkymer product from the first zone and passing it to an alkymer stabilizer in order to recover stable alkymers therefrom, removing unreacted gaseous normal and isoparaffins from the said first zone, fractionally separating normal from isoparaffins in the gaseous mixture removed from the said first zone and passing the separated isoparaffin to a second zone, alkylating the said isoparaffin in liquid phase by intimately contacting it in the second zone with the solution of alkyl acid ester formed in the first zone, under conditions favorable to said alkylation, whereby an isoparaffin of higher molecular weight is produced and acid alkylation catalyst is liberated, effecting a substantial separation of hydrocarbons from said liberated acid alkylation catalyst and passing the separated hydrocarbons to an alkymer stabilizer in order to recover stable alkymers therefrom, and recycling at least a portion of said liberated acid alkylation catalyst to the aforesaid first zone for re-alkylation.

4. Process of alkylating isobutane for the production of isoparaffins of higher molecular weight, which comprises: bringing an acid alkylation catalyst recycled from a second zone and containing alkymer product into contact with a gaseous mixture containing normal butane, isobutane and butene in a first zone, under conditions regulated to favor the formation of butyl acid ester and to suppress isobutane alkylation and other possible reactions, thereby forming a solution of butyl acid ester in an excess of the acid and liberating as an acid-insoluble liquid phase the alkymer product contained in the recycled acid, removing the said liberated liquid alkymer product from the first zone, removing unreacted gaseous normal and isobutanes from the said first zone, fractionally separating normal butane from isobutane in the gaseous mixture removed from the said first zone and passing the separated isobutane to a second zone, alkylating the said isobutane in liquid phase by intimately contacting it in the second zone with the solution of butyl acid ester formed in the first zone, under conditions favorable to said alkylation, whereby an isoparaffin of higher molecular weight is produced and acid alkylation catalyst is liberated, effecting a substantial separation of hydrocarbons from said liberated acid alkylation catalyst, and recycling at least a portion of said liberated acid alkylation catalyst to the aforesaid first zone for re-alkylation.

5. Process of alkylating isobutane for the production of isoparaffins of higher molecular weight, which comprises: bringing a sulfuric acid alkylation catalyst recycled from a second zone and containing alkymer product into contact with a gaseous mixture containing normal butane, isobutane and butene in a first zone, under conditions regulated to favor the formation of butyl acid sulfate and to suppress isobutane alkylation and other possible reactions, thereby forming a solution of butyl acid sulfate in an excess of sulfuric acid of alkylating strength and liberating as an acid-insoluble liquid phase the alkymer product contained in the recycled acid, removing the said liberated liquid alkymer product from the first zone, removing unreacted gaseous normal and isobutanes from the said first zone, fractionally separating normal butane from isobutane in the gaseous mixture removed from the said first zone and passing the separated isobutane to a second zone, alkylating the said isobutane in liquid phase by intimately contacting it in the second zone with the solution of butyl acid sulfate formed in the first zone, under conditions favorable to said alkylation, whereby an isoparaffin of higher molecular weight is produced and sulfuric acid alkylation catalyst is liberated, effecting a substantial separation of hydrocarbons from said liberated sulfuric acid alkylation catalyst, and recycling at least a portion of said liberated sulfuric acid alkylation catalyst to the aforesaid first zone for re-alkylation.

EUGENE H. OAKLEY.
LAVERNE P. ELLIOTT.